United States Patent
Suzuki et al.

(10) Patent No.: US 10,464,440 B2
(45) Date of Patent: Nov. 5, 2019

(54) VEHICLE

(71) Applicant: SUBARU CORPORATION, Tokyo (JP)

(72) Inventors: Hiroyuki Suzuki, Tokyo (JP); Daisuke Umiguchi, Tokyo (JP); Masato Sato, Tokyo (JP); Toshiya Tateishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 66 days.

(21) Appl. No.: 15/905,371

(22) Filed: Feb. 26, 2018

(65) Prior Publication Data
US 2018/0281619 A1 Oct. 4, 2018

(30) Foreign Application Priority Data
Mar. 28, 2017 (JP) ................................. 2017-063780

(51) Int. Cl.
*B60L 15/20* (2006.01)
*H02P 6/08* (2016.01)
*H02P 29/68* (2016.01)

(52) U.S. Cl.
CPC .............. *B60L 15/20* (2013.01); *H02P 6/08* (2013.01); *B60L 2240/36* (2013.01); *B60L 2240/423* (2013.01); *H02P 29/68* (2016.02); *Y02T 10/644* (2013.01); *Y02T 10/7241* (2013.01); *Y02T 10/7275* (2013.01)

(58) Field of Classification Search
CPC .............. B60L 15/20; B60L 2240/36; B60L 2240/423; H02P 6/08; H02P 29/68; Y02T 10/644; Y02T 10/6241; Y02T 10/7275
USPC .................................................. 701/22
See application file for complete search history.

(56) References Cited

U.S. PATENT DOCUMENTS

| 2017/0225676 A1* | 8/2017 | Atarashi | B60K 6/445 |
| 2018/0118192 A1* | 5/2018 | Soma | B60W 10/02 |
| 2018/0237021 A1* | 8/2018 | Orita | B60W 10/08 |

FOREIGN PATENT DOCUMENTS

| JP | 2010-173389 A | 8/2010 |
| JP | 2012-166682 A | 9/2012 |
| JP | 2016-101852 A | 6/2016 |
| JP | 2017-013752 A | 1/2017 |
| WO | 2016/151661 A1 | 9/2016 |

OTHER PUBLICATIONS

Japanese Office Action issued in corresponding Japanese Patent Application No. 2017-063780, dated Sep. 4, 2018, with English Translation.
Japanese Office Action Decision to Grant a Patent issued in corresponding Japanese Patent Application No. 2017-063780, dated Feb. 5, 2019, with English Translation.

* cited by examiner

*Primary Examiner* — Krishnan Ramesh
(74) *Attorney, Agent, or Firm* — McDermott Will & Emery LLP

(57) ABSTRACT

A vehicle includes a drive motor and a motor controller. The drive motor is configured to transfer torque to a wheel. The motor controller is configured to perform torque variation control during a predetermined period, in which, in response to a predetermined trigger for performing a pseudo shift change, torque of the drive motor is decreased by a set variation amount and is then increased.

8 Claims, 5 Drawing Sheets

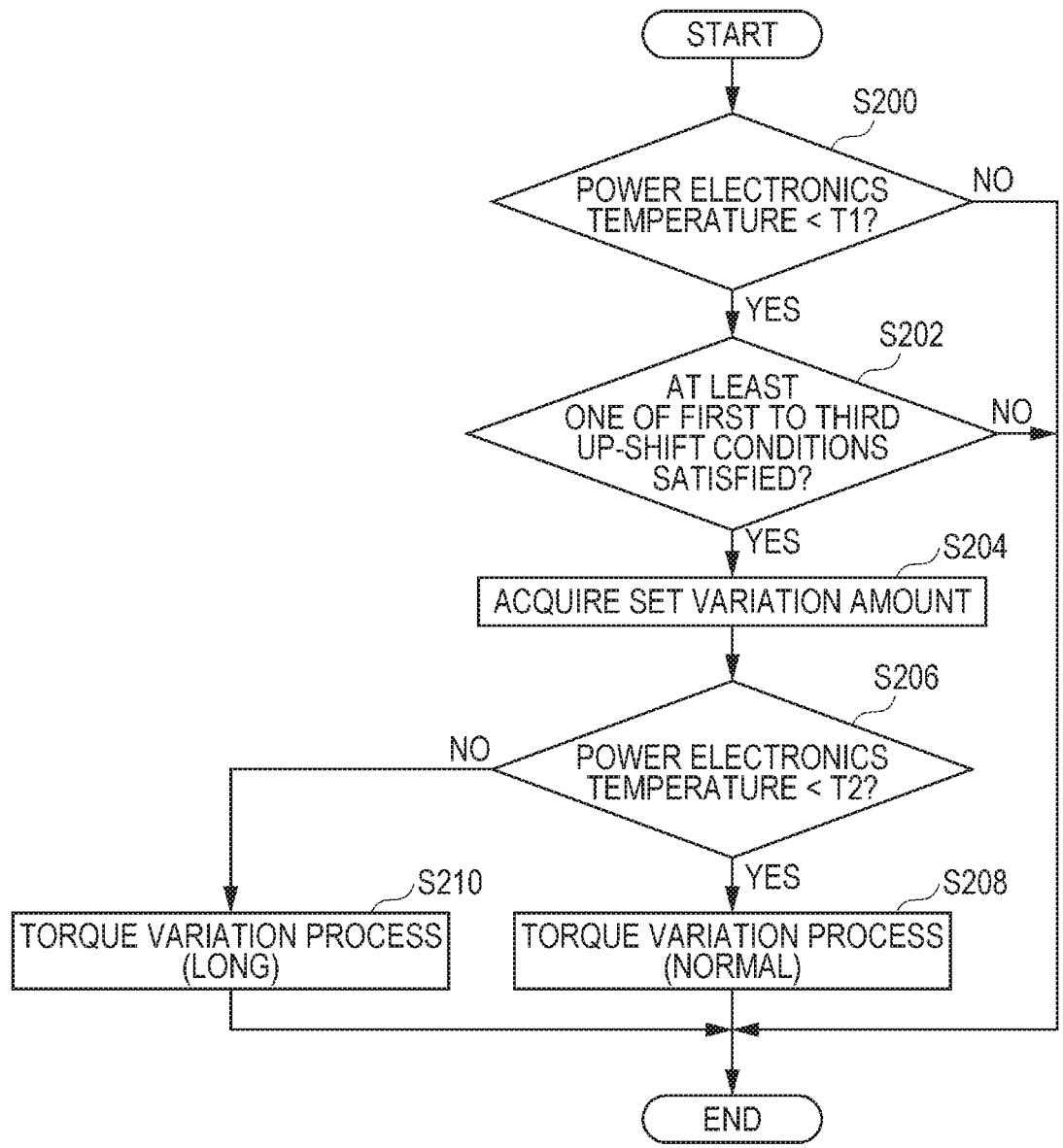

VEHICLE

CROSS-REFERENCE TO RELATED APPLICATIONS

The present application claims priority from Japanese Patent Application No. 2017-063780 filed on Mar. 28, 2017, the entire contents of which are hereby incorporated by reference.

BACKGROUND

1. Technical Field

The present invention relates to a vehicle in which a drive motor transfers torque to wheels.

2. Related Art

In the related art, vehicles that are driven by using drive motors, such as electric cars and hybrid cars, have been commonly used. In some of such vehicles, the rotational speed of the drive motor is varied or the gear ratio is varied by using a continuously variable transmission, without a multi-stage transmission, to control the vehicle velocity (for example, Japanese Unexamined Patent Application Publication No. 2012-166682).

In a vehicle including a multi-stage transmission, in response to the clutch being released at the time of switching the shift stage, torque transferred to the wheels is instantly decreased. In contrast, in a vehicle including no multi-stage transmission and driven by using a motor as a drive source as in the above-described case, such a change in torque does not occur. Accordingly, a driver who is accustomed to driving a vehicle including a multi-stage transmission may feel strange while driving the vehicle including no multi-stage transmission.

In addition, for example, at the time of acceleration, if the temperature of an in-vehicle power electronics device (power electronics temperature) is high, it is not possible to increase the torque of the motor even if the accelerator pedal is depressed. Also in this case, the driver may feel strange.

SUMMARY OF THE INVENTION

In view of the above-described circumstances, it is desirable to provide a vehicle that can suppress an increase in the power electronics temperature and to suppress the feeling of strangeness at the time of shifting.

An aspect of the present invention provides a vehicle including a drive motor configured to transfer torque to a wheel, and a motor controller configured to perform torque variation control during a predetermined period, in which, in response to a predetermined trigger for performing a pseudo shift change, torque of the drive motor is decreased by a set variation amount and is then increased.

BRIEF DESCRIPTION OF THE DRAWINGS

FIG. 5 is a flowchart illustrating a process flow of torque variation control.

DETAILED DESCRIPTION

Figure 1:
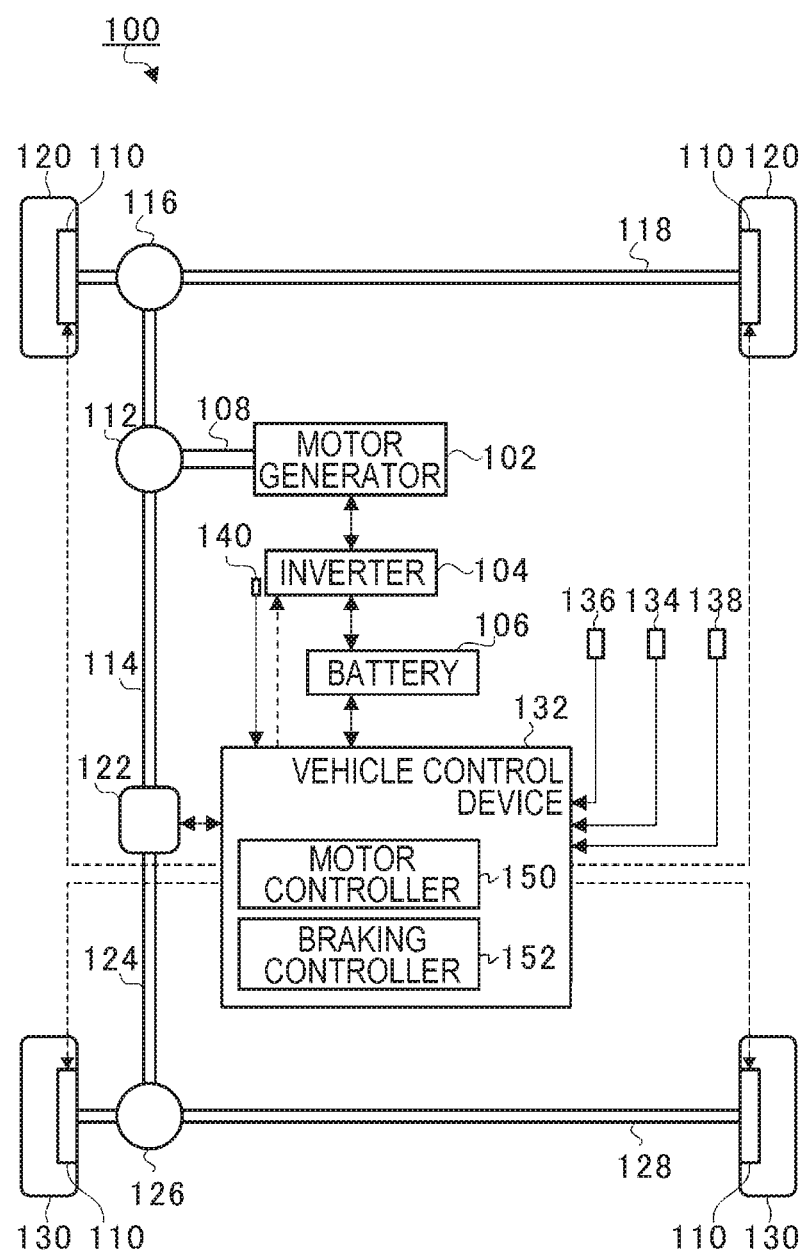
FIG. 1 illustrates a configuration of an electric car (vehicle)

Now, an example of the present invention will be described in detail below with reference to the attached drawings. The scales, materials, and other specific numeric values in the example are merely instances for easy understanding of the invention and do not limit the present invention unless otherwise specified. Note that components having substantially the same functions and configurations will not be repeatedly described in the specification and drawings by being denoted by the same reference numerals, and components that are not directly relevant to the present invention will be omitted from illustrations.

FIG. 1 illustrates a configuration of an electric car (vehicle) 100. As illustrated in FIG. 1, the electric car 100 includes a motor generator (drive motor) 102. Note that although the electric car 100 including the motor generator 102 as a drive source is illustrated as an instance here, the example of the present invention is also applicable to a hybrid car including an engine and a motor as a drive source.

The motor generator 102 is connected with a battery 106 via an inverter 104 and serves as an electric motor that receives electric power from the battery 106 and transfers the electric power to a rotary shaft 108. In addition, at the time of braking the electric car 100, the motor generator 102 serves as a power generator that causes a braking force to act on the electric car 100 in place of or in conjunction with a braking mechanism 110 to generate a regenerative energy. The braking mechanism 110 is, for example, configured from a disk brake, a drum brake, or the like and is provided for each wheel (front wheels 120 and rear wheels 130).

The rotary shaft 108 is connected with a front-wheel propeller shaft 114 via a gear mechanism 112. An end of the front-wheel propeller shaft 114 is connected with a front-wheel drive shaft 118 via a front differential 116, and the other end thereof is connected with a rear-wheel propeller shaft 124 via an electronic control coupling 122. Both ends of the front-wheel drive shaft 118 are connected with the front wheels 120.

A rear end of the rear-wheel propeller shaft 124, which is opposite to the electronic control coupling 122, is connected with a rear-wheel drive shaft 128 via a rear differential 126. Both ends of the rear-wheel drive shaft 128 are connected with the rear wheels 130.

Accordingly, in the electric car 100, torque that is output from the motor generator 102 is transferred to the front wheels 120 via the rotary shaft 108, the gear mechanism 112, the front-wheel propeller shaft 114, the front differential 116, and the front-wheel drive shaft 118. In addition, in the electric car 100, torque that is output from the motor generator 102 is transferred to the rear wheels 130 via the rotary shaft 108, the gear mechanism 112, the front-wheel propeller shaft 114, the electronic control coupling 122, the rear-wheel propeller shaft 124, the rear differential 126, and the rear-wheel drive shaft 128. Thus, the motor generator 102 transfers torque to the wheels (the front wheels 120 and the rear wheels 130) without a multi-stage transmission therebetween.

The electronic control coupling 122 can adjust the ratio between the torque to be transferred to the front wheels 120 and the torque to be transferred to the rear wheels 130 in accordance with a traveling state or an instruction from a driver.

The electric car 100 is further equipped with a vehicle control device 132. The vehicle control device 132 is configured from a semiconductor integrated circuit including a central processing unit (CPU), a read only memory (ROM) in which a program and the like are stored, a random access memory (RAM) as a work area, and the like and collectively controls the units of the electric car 100.

The vehicle control device 132 is connected to each of an accelerator pedal sensor 134, a brake pedal sensor 136, a vehicle velocity sensor 138, a temperature sensor (temperature detector) 140 and reads a signal representing a value detected by each of the sensors at every predetermined interval.

The accelerator pedal sensor 134 detects a depression amount of the accelerator pedal (accelerator opening) and outputs a signal representing the accelerator opening to the vehicle control device 132. The brake pedal sensor 136 detects a depression amount of the brake pedal (brake depression amount) and outputs a signal representing the brake depression amount to the vehicle control device 132. The vehicle velocity sensor 138 detects the vehicle velocity of the electric car 100 and outputs a signal representing the vehicle velocity to the vehicle control device 132.

The temperature sensor 140 detects the temperature of the inverter 104 and outputs a signal representing the temperature of the inverter 104 to the vehicle control device 132. The temperature of the inverter 104 is used in the following description as a power electronics temperature, which is the temperature of an in-vehicle power electronics device. However, in place of the temperature of the inverter 104, the temperature of the battery 106 or the temperature of a converter that converts a high voltage of the battery 106 into a low voltage to be supplied to auxiliary equipment may be used as the power electronics temperature. In addition, in a case of a hybrid car, the temperature of a coolant or an oil of the engine may be used as the power electronics temperature.

The vehicle control device 132 is further connected to the inverter 104 and the battery 106, and transmits a control signal to the inverter 104 and receives a signal representing a battery remaining amount (state of charge (SOC)) from the battery 106.

In addition, at the time of performing a vehicle control process, the vehicle control device 132 serves as a motor controller 150 and a braking controller 152.

The motor controller 150 calculates a target torque of the motor generator 102 by referring to a map that is stored in advance and in accordance with a signal representing the accelerator opening that is input from the accelerator pedal sensor 134 and a signal representing the vehicle velocity that is input from the vehicle velocity sensor 138. In addition, the motor controller 150 controls the motor generator 102 via the inverter 104 in such a manner that the torque of the motor generator 102 becomes the target torque. The torque control performed by the motor controller 150 will be described later in detail.

In response to a signal representing the brake depression amount being input from the brake pedal sensor 136, in accordance with the signal representing the brake depression amount, the motor controller 150 causes the motor generator 102 to serve as a power generator and brakes the electric car 100 while charging the battery 106 with a regenerative energy.

If the braking force of the motor generator 102 is insufficient, the braking controller 152 controls the braking mechanism 110 to brake the electric car 100.

In a vehicle including a multi-stage transmission, in response to the clutch being released at the time of switching the shift stage, torque transferred to the wheels is instantly decreased. In contrast, in the electric car 100 including no multi-stage transmission, such a change in torque does not occur. Accordingly, a driver who is accustomed to driving a vehicle including a multi-stage transmission may feel strange while driving the electric car 100. Thus, the motor controller 150 controls the torque of the motor generator 102 so as to generate a torque variation simulating multi-stage shifting.

Figure 2:
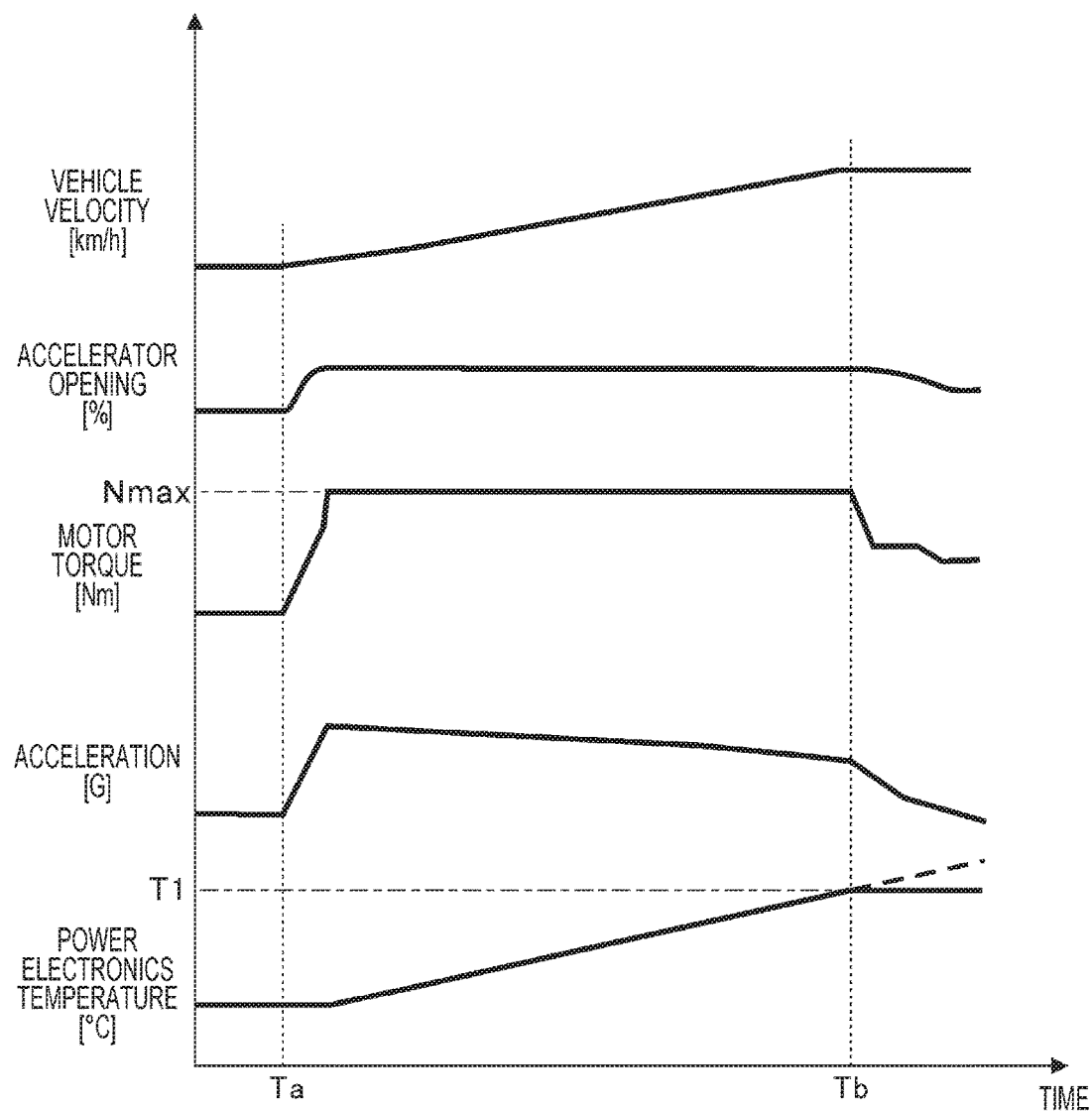
FIG. 2 illustrates a comparative example of torque control of a motor generator.

FIG. 2 illustrates a comparative example of torque control of a motor generator. As illustrated in FIG. 2, in the comparative example, an accelerator pedal is depressed at time Ta, and then, in response to the accelerator opening becoming full open, the torque of the motor generator becomes a maximum torque (torque Nmax). Subsequently, the accelerator opening is kept full open until time Tb. The torque of the motor generator is maintained at the torque Nmax, and the acceleration peaks. As the vehicle velocity is then gradually increased, the acceleration is gradually decreased.

The power electronics temperature is gradually increased after time Ta to reach an upper limit temperature T1 (second threshold) at time Tb. Here, the upper limit temperature T1 is an allowable upper limit of the power electronics temperature and is set in advance.

In response to the power electronics temperature reaching the upper limit temperature T1, regardless of the accelerator opening, the torque of the motor generator decreases from the torque Nmax, preventing an increase in the power electronics temperature.

Figure 3:
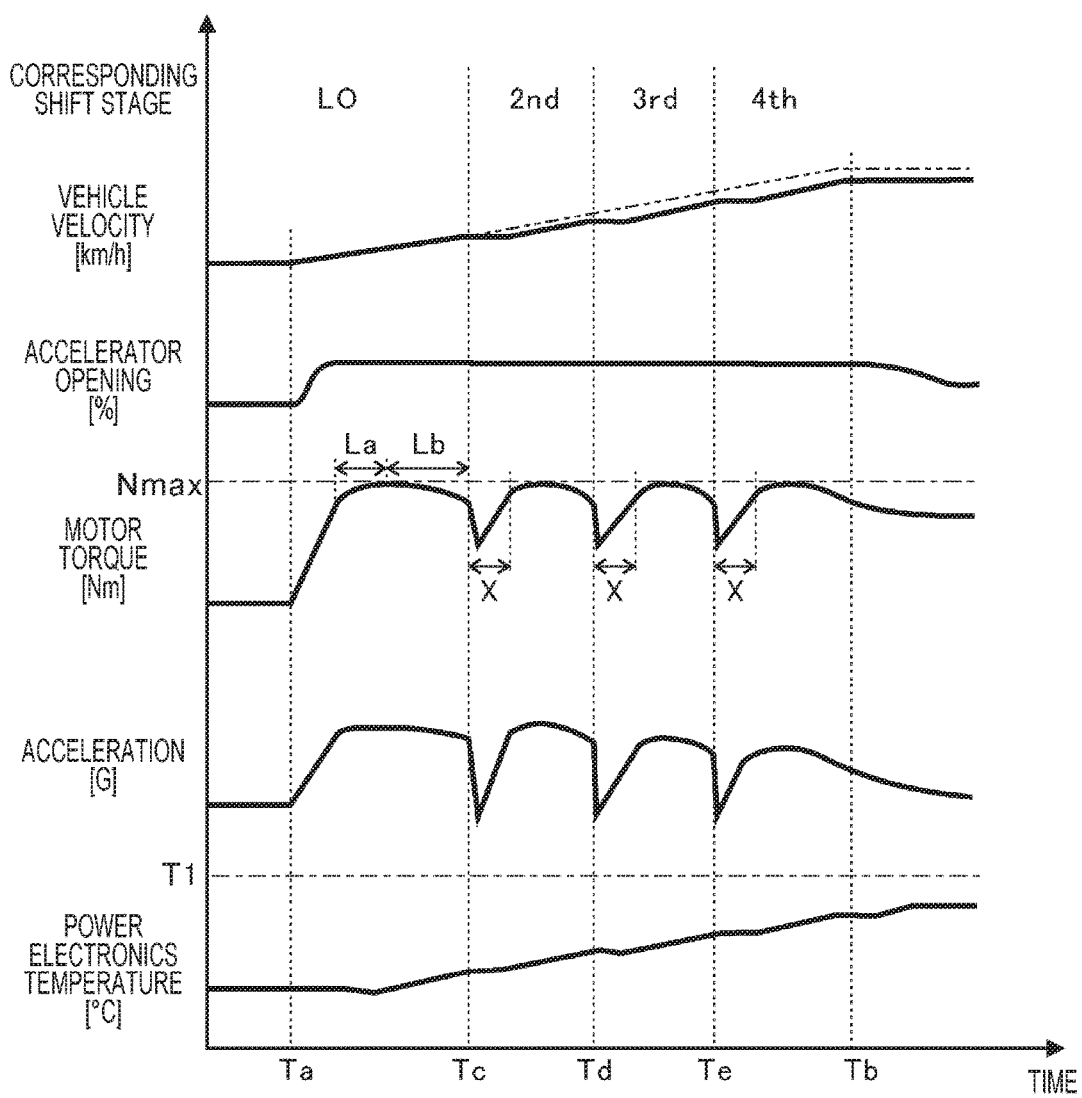
FIG. 3 is a first diagram illustrating an instance of torque control of the motor generator.

FIG. 3 is a first diagram illustrating an instance of torque control of the motor generator 102. In FIG. 3, "LO" denotes a shift stage corresponding to a first gear of multi-stage shifting, "2nd" denotes a shift stage corresponding to a second gear of multi-stage shifting, "3rd" denotes a shift stage corresponding to a third gear of multi-stage shifting, and "4th" denotes a shift stage corresponding to a fourth gear of multi-stage shifting. The following case will be described as an instance: as in the comparative example, an accelerator pedal is depressed at time Ta, and then, in response to the accelerator opening becoming full open, the accelerator opening is kept full open until time Tb. In addition, as in the comparative example, the upper limit temperature T1 is set as the upper limit value of the power electronics temperature. In accordance with a signal that is output from the temperature sensor 140, the motor controller 150 acquires the power electronics temperature in a predetermined cycle.

In addition, in the example, a shift map is set in advance for the vehicle control device 132. In the shift map, a condition is set for each of shifting from the first gear to the second gear, shifting from the second gear to the third gear, and shifting from the third gear to the fourth gear in multi-stage shifting. Hereinafter, a condition for the shifting from the first gear to the second gear will be referred to as a first up-shift condition, a condition for the shifting from the second gear to the third gear will be referred to as a second up-shift condition, and a condition for the shifting from the third gear to the fourth gear will be referred to as a third up-shift condition. The first to third up-shift conditions are provided in accordance with the vehicle velocity, the accelerator opening, the accelerator depressing speed, and the brake depression amount. That is, ranges of the vehicle velocity, the accelerator opening, and the accelerator depressing speed are provided for the first to third up-shift conditions. In addition, a set variation amount, which will be described later, is associated with each of the first to third up-shift conditions.

The motor controller 150 acquires the vehicle velocity, the accelerator opening, the accelerator depressing speed, and the brake depression amount in a predetermined cycle in accordance with signals that are output from the above-described sensors 134 to 138. Then, the motor controller 150 determines whether the vehicle velocity, the accelerator opening, and the accelerator depressing speed satisfy the conditions that are set in the shift map (whether the vehicle velocity, the accelerator opening, and the accelerator depressing speed are included in the ranges thereof provided as the first to third up-shift conditions).

For example, as illustrated in FIG. 3, first, while the electric car 100 travels in a state corresponding to the first gear of multi-stage shifting, in response to the accelerator pedal being depressed at time Ta, the accelerator opening becomes full open. The motor controller 150 increases the torque of the motor generator 102 to the torque Nmax. At this time, the motor controller 150 first linearly increases the torque. Then, during a period La before the torque reaches the torque Nmax, the motor controller 150 decreases an increase rate of the torque per time as the torque becomes closer to the torque Nmax. Further, during a period Lb after the torque has reached the torque Nmax, the motor controller 150 decreases a decrease rate of the torque per time as the torque decreases from the torque Nmax. That is, the motor controller 150 changes the torque in a mountain shape peaking the torque Nmax. Thus, by changing the torque in a mountain shape, it is possible to produce an acceleration feeling that is substantially the same as that of a vehicle including a multi-stage transmission.

Subsequently, it is assumed that the first up-shift condition is satisfied at time Tc. The motor controller 150 decreases the torque of the motor generator 102 by the set variation amount associated with the first up-shift condition and then increases the torque of the motor generator 102. The motor controller 150 decreases and increases the torque during a first predetermined period (predetermined period) X that is set in advance. For example, the first predetermined period X is a period corresponding to a clutch release period in multi-stage shifting. At this time, for example, the torque is decreased during a shorter period than the period during which the torque is increased.

Subsequently, the electric car 100 travels in a state corresponding to the second gear of multi-stage shifting. The motor controller 150 increases the torque of the motor generator 102 to the torque Nmax. At this time, as in the above-described case, the motor controller 150 changes the torque in a mountain shape peaking the torque Nmax.

It is assumed that the second up-shift condition and the third up-shift condition are satisfied at time Td and time Te, respectively, as in the process at time Tc. As in a case in which the first up-shift condition is satisfied, the motor controller 150 decreases the torque of the motor generator 102 by the set variation amount associated with the second and third up-shift conditions and then increases the torque of the motor generator 102. The motor controller 150 decreases and increases the torque during the first predetermined period X. In addition, when the first predetermined period X elapses from the time Td and the time Te, the motor controller 150 increases the torque of the motor generator 102 to the torque Nmax. At this time, the electric car 100 travels in a state corresponding to the third gear and the fourth gear of multi-stage shifting, and, as in the above-described case, the motor controller 150 changes the torque in a mountain shape peaking the torque Nmax.

In the above-described case, the torque is decreased and increased during the same first predetermined period X when any of the first, second, and third upshift conditions is satisfied. However, different values may be set as the first predetermined period X depending on the first to third upshift conditions.

In the above manner, in response to a predetermined trigger for performing a pseudo shift change, the motor controller 150 decreases the torque of the motor generator 102 by the set variation amount and then increases the torque of the motor generator 102 (hereinafter referred to as torque variation control) during the first predetermined period X. Here, the predetermined trigger is satisfaction of at least one of the first to third up-shift conditions.

In addition, as long as the power electronics temperature acquired in a predetermined cycle is higher than or equal to the upper limit temperature T1, even if one or more of the first to third up-shift conditions are satisfied (even if the predetermined trigger is present), the motor controller 150 does not perform the above-described torque variation control. As in the comparative example at and after time Tb, the motor controller 150 decreases the torque of the motor generator 102 regardless of the accelerator opening in order to prevent an increase in the power electronics temperature.

As a result of the above-described torque variation control, as illustrated in FIG. 3, the torque and acceleration instantly decrease right after time Tc, time Td, and time Te. Thus, although the increase rate of the vehicle velocity is decreased compared with the vehicle velocity in the comparative example, which is represented by the two-dot chain line in FIG. 3, a pseudo shift change is performed, and it is possible to reduce the feeling of strangeness of a driver who is accustomed to driving a vehicle including a multi-stage transmission. In addition, unlike in the comparative example in which the vehicle velocity is linearly increased, a stepwise acceleration feeling is generated when the vehicle velocity is increased. Any acceleration feeling can be set in accordance with the torque variation control performed by the motor controller 150, and thus, an acceleration feeling that is unique to the electric car 100, which is different from any other vehicles, can be produced.

In addition, in the comparative example, the driver feels strange because the vehicle is not accelerated even if the accelerator opening becomes full open after the power electronics temperature reaches the upper limit temperature T1 at time Tb. In contrast, in this example, torque is decreased right after time Tc, time Td, and time Te. This suppresses the increase in the power electronics temperature compared with that in the comparative example. Thus, it takes a longer time for the power electronics temperature to reach the upper limit temperature T1 (the power electronics temperature does not reach the upper limit temperature T1 in the instance illustrated in FIG. 3). In addition, it is possible to suppress the generation of an event by which the driver feels strange because the vehicle is not accelerated even if the driver depresses the accelerator pedal. Furthermore, since the increase in the power electronics temperature is suppressed, the service life of the motor generator 102, the inverter 104, the battery 106, and the like can be increased.

Figure 4:
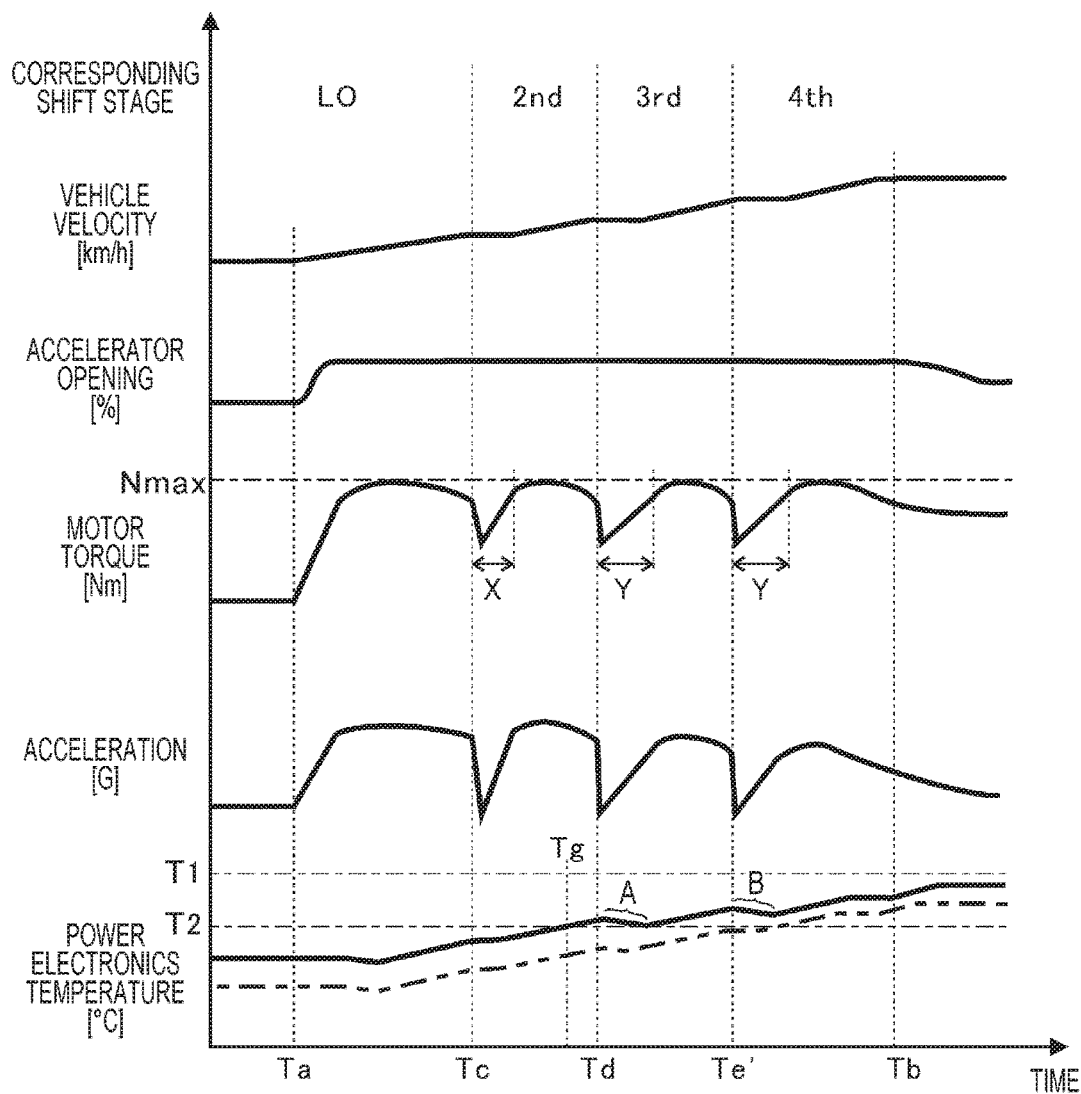
FIG. 4 is a second diagram illustrating an instance of torque control of the motor generator.

FIG. 4 is a second diagram illustrating an instance of torque control of the motor generator 102. In FIG. 4, the following case will be described as an instance: the initial value of the power electronics temperature is higher than the power electronics temperature illustrated in FIG. 3 (represented by the two-dot chain line in FIG. 4).

If the power electronics temperature acquired in a predetermined cycle is higher than or equal to a limit temperature T2 (first threshold) that is set in advance, the motor controller 150 performs the above-described torque variation control during a period that is longer than the predetermined period. The limit temperature T2 is, for example, lower than the upper limit temperature T1 (has a smaller value).

Specifically, it is assumed that the power electronics temperature becomes higher than or equal to the limit temperature T2 at time Tg. Subsequently, if the second up-shift condition is satisfied at time Td, the motor controller 150 decreases the torque of the motor generator 102 by the set variation amount associated with the second up-shift condition and then increases the torque of the motor generator 102. The motor controller 150 decreases and increases the torque during a second predetermined period Y that is longer than the first predetermined period X.

Similarly, if the third up-shift condition is satisfied at time Te', the motor controller 150 decreases the torque of the motor generator 102 by the set variation amount associated with the third up-shift condition and then increases the torque of the motor generator 102. The motor controller 150 decreases and increases the torque during the second predetermined period Y that is longer than the first predetermined period X.

In the above-described case, the torque is increased and decreased during the same second predetermined period Y when any of the second and third up-shift conditions is satisfied. However, different values may be set as the second predetermined period Y depending on the first to third up-shift conditions.

As a result, it takes a longer time to decrease the torque in response to the second and third up-shift conditions being satisfied, and the increase in the power electronics temperature is suppressed during periods A and B illustrated in FIG. 4 (in the instance illustrated in FIG. 4, the power electronics device is slightly cooled). Thus, it takes a longer time for the power electronics temperature to reach the upper limit temperature T1 (the power electronics temperature does not reach the upper limit temperature T1 in the instance illustrated in FIG. 4). In addition, it is possible to suppress the generation of an event by which the driver feels strange because the vehicle is not accelerated even if the driver depresses the accelerator pedal.

Note that in the above-described case, in response to the accelerator opening becoming full open, the electric car 100 is accelerated. However, the accelerator opening may have any value, other than full open, as long as the value is larger than or equal to the value provided in the first to third up-shift conditions.

In addition, in the shift map, in addition to the above-described first to third up-shift conditions, a condition is set for each of shifting from the fourth gear to the third gear, shifting from the third gear to the second gear, and shifting from the second gear to the first gear in multi-stage shifting. Hereinafter, a condition for the shifting from the fourth gear to the third gear will be referred to as a first down-shift condition, a condition for the shifting from the third gear to the second gear will be referred to as a second down-shift condition, and a condition for the shifting from the second gear to the first gear will be referred to as a third down-shift condition. The first to third down-shift conditions are provided in accordance with the vehicle velocity and the brake depression amount. That is, ranges of the vehicle velocity and the brake depression amount are provided for the first to third down-shift conditions. In addition, the set variation amount is associated with each of the first to third down-shift conditions.

If the electric car 100 is decelerated, the same torque variation control is performed for the braking torque of the motor generator 102. In this case, it is possible to suppress the feeling of strangeness with respect to a deceleration feeling of a driver who is accustomed to drive a vehicle including a multi-stage transmission.

FIG. 5 is a flowchart illustrating a process flow of torque variation control. The process illustrated in FIG. 5 is repeatedly performed in a predetermined cycle. In FIG. 5, in particular, the process flow of torque variation control corresponding to the first to third up-shift conditions will be described.

S200

The motor controller 150 determines whether the power electronics temperature is lower than the upper limit temperature T1. If the power electronics temperature is lower than the upper limit temperature T1, the process proceeds to step S202. If the power electronics temperature is higher than or equal to the upper limit temperature T1, the process of torque variation control ends.

S202

The motor controller 150 determines whether at least any one of the first to third up-shift conditions is satisfied. If at least one of the first to third up-shift conditions is satisfied, the process proceeds to step S204. If none of the first to third up-shift conditions is satisfied, the process of torque variation control ends.

S204

The motor controller 150 acquires, from a storage region, the value of a set variation amount associated with any of the first to third up-shift conditions satisfied in step S202.

S206

The motor controller 150 determines whether the power electronics temperature is lower than the limit temperature T2. If the power electronics temperature is lower than the limit temperature T2, the process proceeds to step S208. If the power electronics temperature is higher than or equal to the limit temperature T2, the process proceeds to step S210.

S208

The motor controller 150 decreases the torque of the motor generator 102 by the set variation amount acquired in step S204 and then increases the torque of the motor generator 102, and the process of torque variation control ends. The motor controller 150 decreases and increases the torque in this manner during the first predetermined period X.

S210

The motor controller 150 decreases the torque of the motor generator 102 by the set variation amount acquired in step S204 and then increases the torque of the motor generator 102, and the process of torque variation control ends. The motor controller 150 decreases and increases the torque in this manner during the second predetermined period Y that is longer than the first predetermined period X.

The example of the present invention has been described above with reference to the attached drawings. However, it is needless to say that the present invention is limited to the example. A person skilled in the art will understand that various changes or modifications can be made without departing from the scope of the claims, and that these changes or modifications also belong to the technical scope of the present invention.

For example, the above example has described a case in which the first to third up-shift conditions are provided by the vehicle velocity, the accelerator opening, and the accelerator depressing speed. However, the first to third up-shift conditions may be provided by one or more of the vehicle velocity, the accelerator opening, and the accelerator depressing speed. Here, the accelerator depressing speed is a condition for performing torque variation control simulating a so-called kickdown in multi-stage shifting. In addition, the first to third up-shift conditions may be provided further by a continuation period (open period) during which the accelerator opening becomes larger than or equal to a predetermined value.

In addition, the electric car 100 may include a paddle shifter or a tip shifter. In this case, in response to acquisition of a signal representing an operation input to the paddle shifter or the tip shifter, the motor controller 150 performs the above-described torque variation control.

The above example has described a case in which the set variation amount is associated with each of the first to third up-shift conditions and the first to third down-shift conditions. However, the set variation amount may be the same value for each of the first to third up-shift conditions and the first to third down-shift conditions.

In addition, the above example has described a case in which, if the power electronics temperature is higher than or equal to the limit temperature T2, the motor controller 150 performs the above-described torque variation control during the second predetermined period Y that is longer than the first predetermined period X. However, even if the power electronics temperature is higher than or equal to the limit temperature T2, the motor controller 150 may perform the above-described torque variation control during the first predetermined period X.

According to an example of the present invention, it is possible to suppress an increase in the power electronics temperature and to suppress the feeling of strangeness at the time of shifting.

The invention claimed is:

1. A vehicle comprising:
a drive motor configured to transfer torque to a wheel;
a motor controller configured to perform torque variation control during a predetermined period, in which, in response to a predetermined trigger for performing a pseudo shift change, torque of the drive motor is decreased by a set variation amount and is then increased; and
a temperature detector configured to detect a temperature of an onboard power electronics device,
wherein, if the temperature is higher than or equal to a first threshold, the motor controller performs the torque variation control during a period longer than the predetermined period.

2. The vehicle according to claim 1, wherein the predetermined trigger is provided by one or more of a vehicle velocity, an accelerator opening, an accelerator depressing speed, and a brake depression amount.

3. The vehicle according to claim 2, wherein the predetermined trigger is satisfaction of any one of multiple conditions, and the set variation amount is associated with each of the multiple conditions.

4. The vehicle according to claim 3, wherein, if the temperature is higher than or equal to a second threshold that is higher than the first threshold, the motor controller does not perform the torque variation control even if the predetermined trigger is present.

5. The vehicle according to claim 2, wherein, if the temperature is higher than or equal to a second threshold that is higher than the first threshold, the motor controller does not perform the torque variation control even if the predetermined trigger is present.

6. The vehicle according to claim 1, wherein the predetermined trigger is satisfaction of any one of multiple conditions, and the set variation amount is associated with each of the multiple conditions.

7. The vehicle according to claim 6, wherein, if the temperature is higher than or equal to a second threshold that is higher than the first threshold, the motor controller does not perform the torque variation control even if the predetermined trigger is present.

8. The vehicle according to claim 1, wherein, if the temperature is higher than or equal to a second threshold that is higher than the first threshold, the motor controller does not perform the torque variation control even if the predetermined trigger is present.

* * * * *